US009580550B2

(12) United States Patent
Gruetzner et al.

(10) Patent No.: US 9,580,550 B2
(45) Date of Patent: Feb. 28, 2017

(54) METHOD FOR PRODUCING POLYAMIDE COMPOSITE MATERIALS CONTAINING SILICON

(71) Applicant: BASF SE, Ludwigshafen (DE)

(72) Inventors: Rolf-Egbert Gruetzner, Rudolstadt (DE); Arno Lange, Bad Duerkheim (DE); Lysann Kassner, Chemnitz (DE); Andreas Seifert, Chemnitz (DE); Stefan Spange, Orlamuende (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/891,852

(22) PCT Filed: May 16, 2014

(86) PCT No.: PCT/EP2014/060078
§ 371 (c)(1),
(2) Date: Nov. 17, 2015

(87) PCT Pub. No.: WO2014/184342
PCT Pub. Date: Nov. 20, 2014

(65) Prior Publication Data
US 2016/0096923 A1  Apr. 7, 2016

(30) Foreign Application Priority Data

May 17, 2013  (EP) ..................................... 13168352

(51) Int. Cl.
| C08G 69/06 | (2006.01) |
| C08K 3/36 | (2006.01) |
| C08G 69/02 | (2006.01) |
| C08G 69/14 | (2006.01) |
| C08G 69/16 | (2006.01) |
| C08G 69/42 | (2006.01) |
| C08G 77/455 | (2006.01) |
| C08L 77/00 | (2006.01) |
| C08L 77/02 | (2006.01) |
| C08G 83/00 | (2006.01) |

(52) U.S. Cl.
CPC ............. *C08G 69/06* (2013.01); *C08G 69/02* (2013.01); *C08G 69/14* (2013.01); *C08G 69/16* (2013.01); *C08G 69/42* (2013.01); *C08G 77/455* (2013.01); *C08G 83/001* (2013.01); *C08K 3/36* (2013.01); *C08L 77/00* (2013.01); *C08L 77/02* (2013.01)

(58) Field of Classification Search
CPC .. C08L 77/02; C08K 3/34; C08K 5/54; C08G 69/14; C08G 69/16
See application file for complete search history.

(56) References Cited

U.S. PATENT DOCUMENTS

| 3,364,160 A | 1/1968 | Hans Dietrich Gölitz et al. |
| 3,417,047 A | 12/1968 | Hans Dietrich Gölitz et al. |
| 4,071,498 A | 1/1978 | Frye et al. |
| 4,599,393 A | 7/1986 | Policastro |
| 4,603,177 A | 7/1986 | Policastro et al. |
| 4,739,007 A | 4/1988 | Okada et al. |
| 5,597,888 A * | 1/1997 | Nielinger ............... C08G 69/16 528/323 |
| 6,057,396 A | 5/2000 | Lan et al. |
| 6,136,908 A | 10/2000 | Liao et al. |
| 6,906,127 B2 | 6/2005 | Liang et al. |
| 2005/0256244 A1 | 11/2005 | Liang et al. |
| 2011/0240197 A1 | 10/2011 | Mruk et al. |

FOREIGN PATENT DOCUMENTS

| DE | 1 247 646 C2 | 11/1973 |
| DE | 25 01 348 A1 | 7/1976 |
| DE | 26 43 467 A1 | 6/1977 |
| DE | 27 32 328 A1 | 2/1979 |
| DE | 32 07 336 A1 | 9/1982 |
| EP | 0 284 968 A1 | 10/1988 |
| EP | 0 387 895 A2 | 9/1990 |
| EP | 2 371 581 A1 | 10/2011 |

OTHER PUBLICATIONS

International Search Report issued Sep. 17, 2014 in PCT/EP2014/060078 (with English language translation).
International Preliminary Report on Patentability and Written Opinion issued Nov. 17, 2015 in PCT/EP2014/060078 filed May 16, 2014 (with English language translation).
Africa Yebra-Rodriguez, et al., "Crystalline properties of injection molded polyamide-6 and polyamide-6/montmorillonite nanocomposites" Applied Clay Science, vol. 43, 2009, pp. 91-97.
Feng Yang, et al., "Polyamide 6/Silica Nanocomposites Prepared by In Situ Polymerization" Journal of Applied Polymer Science, vol. 69, No. 2, XP000802834, 1998, pp. 355-361.
Somayeh Mohamadi, et al., "Preperation of Nylon 6-Organoclay Nanocomposites via In-Situ Polymerization and Investigation of the Crystalline and Thermal Properties" Journal of Nanoscience and Nanotechnology, vol. 9, No. 6, 2009, pp. 3959-3965.
Stefan Spange, et al., "Nanostructured Organic-Inorganic Composite Materials by Twin Polymerization of Hybrid Monomers" Advanced Materials, vol. 21, XP002595150, 2009, pp. 2111-2116.

(Continued)

*Primary Examiner* — Gregory Listvoyb
(74) *Attorney, Agent, or Firm* — Oblon, McClelland, Maier & Neustadt, L.L.P.

(57) ABSTRACT

The invention relates to a method for producing polyamide composite materials containing silicon, comprising the copolymerisation of: a) at least one silicon compound (SV) having at least one silicon atom, said silicon atom having at least one lactamyl group of formula (A) bonded by means of the nitrogen atom thereof; b) the method also comprises copolymerisation with at least one comonomer (CM) that is selected from among ammonium salts of dicarboxylic acids, amino acids, amino acid amides and lactams. In formula (A), m represents a whole number between 1 and 11, in particular in between 2 and 9, and specifically 3, and # represents the connection to the silicon atom of the compound (SV).

18 Claims, 4 Drawing Sheets

(56) References Cited

OTHER PUBLICATIONS

Stefan Spange, et al., "Nanocomposites with Structure Domains of 0.5 to 3 nm by Polymerization of Silicon Spiro Compounds" Angewandte Chemie International Edition, vol. 48, 2009, pp. 8254-8258.

* cited by examiner

METHOD FOR PRODUCING POLYAMIDE COMPOSITE MATERIALS CONTAINING SILICON

The present invention relates to a process for production of silicon-containing polyamide composite materials, hereinafter also called polyamide-silicon composites, to the composite materials obtainable by this process and also to their use.

Polyamides are polymers produced worldwide on a large scale and are used in the main for fibers, engineering polymers and film/sheet besides many other purposes. Nylon-6 is the polyamide with the highest production volume, accounting for about 57% of total polyamide production.

Composite materials based on polyamides (hereinafter also called polyamide composites) are typically produced by incorporating finely divided, generally inorganic, fillers in a polyamide matrix. Polyamide composites are also obtainable by polymerizing the corresponding monomers in the presence of finely divided fillers.

The filler in the polyamide matrix can confer various improved or even new properties on the original polyamide (A. Yebra-Rodriguez et al., Appl. Clay Sci. 2009, 43, 91-97). Silicon dioxide is probably the best-known and most frequently employed inorganic filler. It undoubtedly improves the mechanical and thermal properties of the polyamide significantly.

However, uniform incorporation of a filler in the polyamide always requires some chemical modification of the filler.

U.S. Pat. No. 4,739,007 describes the production of polyamide-silicon composites in a two-step process wherein a chemically modified sheet-silicate, for example montmorillonite previously treated with a swelling agent, is first incorporated in a monomer melt and then a polymerization is carried out. The composite material obtained has high mechanical strength and good high-temperature properties and contains the silicate constituent in the form of an exfoliated phyllosilicate dispersed in the polymer matrix.

F. Yang et al., J. Appl. Polym. Sci. 1998, 69, 355-361 describe a process for production of polyamide-silicon composites wherein a suspension of an aminobutyric acid-modified silica is polymerized in ε-caprolactam to form nylon-6.

S. Mohamadi et al., J. Nanosci. Nanotechnol. 2009, 9, 3959-3965 describe a similar process for production of polyamide-silicon composites by polymerizing a caprolactam melt comprising a chemically modified montmorillonite.

U.S. Pat. Nos. 6,136,908, 2005256244, 6,906,127, 6,057, 396 describe two-step processes for production of silicon-containing polyamide composites wherein a polyamide-forming monomer, for example a lactam monomer, is first intercalated in a swellable sheet-silicate and this intercalated monomer is polymerized in the second step to form nanocomposites comprising silicate layers dispersed in a thermoplastic polymer matrix.

Existing processes for production of polyamide composite materials are all based on the incorporation of finely divided chemically modified fillers in a polyamide melt or in the polyamide-forming monomers. This presents a whole series of problems, especially the inhomogeneity of the resulting polymer composites, but also the difficult handleability of the sheet-silicates, such as reagglomeration risks of sheet-silicates during incorporation in the monomers, imposing a ceiling on the amounts added. In addition, the substances used to modify the fillers often have an adverse effect on product quality, for example product color or product stability. Lastly, the handling of pulverulent materials harbors health risks.

Numerous improvements and developments in the production of polyamide-silicon composites notwithstanding, the problems described here have hitherto prevented any use of polyamide-silicon composites on a large industrial scale.

There have been various reports of processes for production of silicon-containing composite materials by twin polymerization. However, only composite materials based on phenolic resins or polyfurfuryl resins are obtainable by this process (see for instance S. Spange, S. Grund, Adv. Mat. 2009, 21, 2111-2116 and S. Spange et al., Angew. Chem. 2009, 121, 8403-8408; Angew. Chem. Int Ed. 2009, 48, 8254-8258).

It is an object of the present invention to provide a process for production of silicon-containing polyamide composite materials which avoids the aforementioned disadvantages. More particularly, this process shall permit the production of polyamide-silicon composites without costly and inconvenient addition of chemically modified inorganic and pulverulent fillers, in a one-pot reaction, i.e., deliver homogeneous silicon-containing polyamide composites in situ.

It has been found that, surprisingly, this object and further objects are achieved by a process wherein at least one silicon compound SV comprising at least one silicon atom comprising at least one lactamyl radical attached via its nitrogen atom and having the hereinbelow defined formula (A), is copolymerized with aminocarboxylic acids and/or ammonium salts of dicarboxylic acids and/or lactams.

(A)

In formula A, m is an integer from 1 to 11, especially from 2 to 9 and specifically is 3 and # denotes the point of attachment to the silicon atom of compound SV.

The present invention accordingly provides processes for production of silicon-containing composite materials, comprising the copolymerization of a. at least one silicon compound SV comprising at least one silicon atom comprising at least one lactamyl radical attached via its nitrogen atom and having formula (A),
b. at least one comonomer CM selected from ammonium salts of dicarboxylic acids, aminocarboxylic acids, aminocarboxamides and lactams;

wherein the at least one comonomer CM is selected such that water is formed during copolymerization, or water is added to the copolymerization reaction.

The process of the present invention differs from the known production processes of the prior art in that the silicon can be introduced directly into the polymerization in the form of a compound which is soluble in the monomers. The use of pulverulent chemically modified fillers and the attendant problems, such as poor handleability and health risks, can be obviated in this way. In addition, the risk of contamination with impurities in naturally occurring silicates is reduced.

The process of the present invention is also notable in that, in the composite materials obtained, the silicon constituents form a very much more uniform dispersion in the polyamide matrix than is possible with the use of pulverulent fillers. The silicon-containing polyamide composites obtainable according to the present invention are accordingly new and likewise form part of the subject matter of the present invention.

It is believed that the composite synthesis, like the twin polymerization described by Spange et al., proceeds via a coupled twin polymerization, which represents a new form of twin polymerization. In what follows, only the term "copolymerization" will be used, for simplicity. The determinative feature of a twin polymerization is that the polymerization of one twin monomer produces both an organic homopolymer and an inorganic homopolymer. In some cases, for example those described by Spange et al., the twin polymerization takes place with the release of water, but in the present case it consumes water. Owing to the presumably simultaneous formation of the two polymers, i.e., a polyamide and a silicon oxide polymer, both are generally present in a very fine dispersion, wherein the dimensions for the domains of the polymer phases are generally on the nanometer scale, for example below 1000 nm or even below 200 nm.

Terms such as, for example, "alkyl", "alkoxy", "alkenyl" and "aryl", used for organic groups here and hereinbelow to define the formulae, are collectives which are representative of the individual members of these groups of organic units. The prefix $C_x$-$C_y$ identifies the number of possible carbon atoms in the particular case.

The term "$C_1$-$C_6$-alkyl" indicates a saturated, straight-chain or branched hydrocarbyl group of 1 to 6 carbon atoms, specifically 1 to 4 carbon atoms, for example methyl, ethyl, propyl, 1-methylethyl, butyl, 1-methyl propyl, 2-methylpropyl, 1,1-dimethylethyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl and their isomers. $C_1$-$C_4$-Alkyl comprises, for example, methyl, ethyl, propyl, 1-methylethyl, butyl, 1-methylpropyl, 2-methylpropyl or 1,1-dimethylethyl.

The term "optionally substituted $C_1$-$C_6$-alkyl" is for unsubstituted $C_1$-$C_6$-alkyl, as defined above, or for $C_1$-$C_6$-alkyl wherein one of the hydrogen atoms is replaced by a substituent, for example $C_1$-$C_4$-alkoxy, phenyl or $C_3$-$C_6$-cycloalkyl.

The term "$C_2$-$C_6$-alkenyl" indicates an unsaturated, straight-chain or branched hydrocarbyl group of 2 to 6 carbon atoms, specifically 2 to 4 carbon atoms, for example ethenyl (=vinyl), 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl or 1-ethyl-2-methyl-2-propenyl.

The term "optionally substituted $C_1$-$C_6$-alkenyl" is for unsubstituted $C_1$-$C_6$-alkyl, as defined above, or for $C_1$-$C_6$-alkyl wherein one of the hydrogen atoms is replaced by a substituent, such as $C_1$-$C_4$-alkoxy, phenyl or $C_3$-$C_6$-cycloalkyl.

The term "$C_1$-$C_6$-alkoxy" describes straight-chain or branched saturated alkyl groups comprising 1 to 6 carbon atoms, which are attached via an oxygen atom. Examples are $C_1$-$C_6$-alkoxy such as, for example, methoxy, ethoxy, $OCH_2$—$C_2H_5$, $OCH(CH_3)_2$, n-butoxy, $OCH(CH_3)$—$C_2H_5$, $OCH_2$—$CH(CH_3)_2$, $OC(CH_3)_3$, n-pentoxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, n-hexoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy, 1-ethyl-2-methylpropoxy, etc.

The term "optionally substituted $C_1$-$C_6$-alkoxy" is for unsubstituted $C_1$-$C_6$-alkoxy, as defined above, or for $C_1$-$C_6$-alkoxy wherein one of the hydrogen atoms is replaced by a substituent, for example $C_1$-$C_4$-alkoxy, phenyl or $C_3$-$C_6$-cycloalkyl.

The term "$C_3$-$C_8$-cycloalkyl" describes mono- or bicyclic, saturated hydrocarbyl radicals comprising 3 to 8 carbon atoms, specifically 3 to 6 carbon atoms. Examples of monocyclic radicals comprise cyclopropyl, cyclobutyl, cyclopentyl, cyclohexyl, cycloheptyl or cyclooctyl. Examples of bicyclic radicals comprise bicyclo[2.2.1]heptyl, bicyclo[3.1.1]heptyl, bicyclo[2.2.2]octyl and bicyclo[3.2.1]octyl. Optionally substituted $C_3$-$C_8$-cycloalkyl in this context is to be understood as meaning a cycloalkyl radical of 3 to 8 carbon atoms wherein at least one hydrogen atom, for example 1, 2, 3, 4 or 5 hydrogen atoms, are replaced by substituents which are inert under the conditions of the reaction. Examples of inert substituents are CN, $C_1$-$C_6$-alkyl, $C_1$-$C_4$-haloalkyl, $C_1$-$C_6$-alkoxy, $C_3$-$C_6$-cycloalkyl, and $C_1$-$C_4$-alkoxy-$C_1$-$C_6$-alkyl.

The term "optionally substituted $C_3$-$C_8$-cycloalkyl" is for unsubstituted $C_3$-$C_8$-cycloalkyl, as defined above, or for $C_3$-$C_8$-cycloalkyl wherein one or more, for example 1, 2, 3 or 4, of the hydrogen atoms are replaced by substituents, for example $C_1$-$C_4$-alkyl, $C_1$-$C_4$-alkoxy, phenyl or $C_3$-$C_6$-cycloalkyl.

The term "optionally substituted phenyl" as used herein is for unsubstituted phenyl or describes phenyl bearing 1, 2, 3, 4, or 5, especially 1, 2 or 3, substituents which are inert under the conditions of the reaction. Examples of inert substituents are halogen, especially fluorine, chlorine or bromine, CN, $NO_2$, $C_1$-$C_6$-alkyl, $C_1$-$C_6$-alkylthio, $C_1$-$C_6$-alkylsulfonyl, $C_1$-$C_4$-haloalkyl, $C_1$-$C_6$-alkoxy, $C_3$-$C_6$-cycloalkyl, and $C_1$-$C_4$-alkoxy-$C_1$-$C_6$-alkyl.

The term "optionally substituted phenyl-$C_1$-$C_6$-alkyl" as used herein describes $C_1$-$C_6$-alkyl wherein one of the hydrogen atoms is replaced by an optionally substituted phenyl group. Examples are benzyl, 4-methylbenzyl, phenylethyl, etc.

The term "optionally substituted phenyl" as used herein is for unsubstituted phenyl or phenyl bearing 1, 2, 3, 4, or 5, especially 1, 2, or 3, substituents which are inert under the conditions of the polymerization. Examples of inert substituents are halogen, especially fluorine, chlorine or bromine, CN, $NO_2$, $C_1$-$C_6$-alkyl, $C_1$-$C_6$-alkoxy and $C_3$-$C_6$-cycloalkyl.

The term "phenyl-$C_1$-$C_6$-alkyl" as used herein describes $C_1$-$C_6$-alkyl wherein one of the hydrogen atoms is replaced by a phenyl group. Examples are benzyl, 4-methylphenyl, phenylethyl, etc.

The term "optionally substituted phenyl-$C_1$-$C_6$-alkyl" as used herein describes phenyl-$C_1$-$C_6$-alkyl, as defined above, wherein phenyl is unsubstituted or bears 1, 2, 3, 4, or 5, especially 1, 2 or 3, substituents which are inert under the conditions of the polymerization. Examples of inert substituents are halogen, especially fluorine, chlorine or bromine, CN, $NO_2$, $C_1$-$C_6$-alkyl, $C_1$-$C_6$-alkoxy and $C_3$-$C_6$-cycloalkyl.

The process of the present invention comprises copolymerizing at least one silicon compound SV with at least one comonomer CM.

Suitable silicon compounds SV are particularly those of general formula I (I)

where
m is an integer from 1 to 11, especially from 2 to 9 and specifically is 3,
x is 1, 2, 3 or 4 and especially 3 or 4, and
R is optionally substituted $C_1$-$C_6$-alkyl, optionally substituted $C_2$-$C_6$-alkenyl, optionally substituted $C_1$-$C_6$-alkoxy, optionally substituted $C_3$-$C_6$-cycloalkyl, optionally substituted phenyl or optionally substituted phenyl $C_1$-$C_6$-alkyl.

R in formula I is especially $C_1$-$C_6$-alkyl or $C_3$-$C_6$-cycloalkyl and specifically $C_1$-$C_4$-alkyl when x is 1, 2 or 3.

Examples of compounds of the general formula I are
1,1',1'',1'''-silanetetrayltetrakis(azepan-2-one) (=compound of formula I where x=4 and m=3) and
1,1',1''-(methylsilanetriyl)tri(azepan-2-one) (=compound of formula I where x=3, R=$CH_3$ and m=3).

Suitable silicon compounds SV also include oligomers comprising at least one repeat unit of general formula II:

(II)

m is an integer from 1 to 11, especially from 2 to 9 and specifically is 3,
R' is optionally substituted $C_1$-$C_6$-alkyl, optionally substituted $C_2$-$C_6$-alkenyl, optionally substituted $C_1$-$C_6$-alkoxy, optionally substituted $C_3$-$C_6$-cycloalkyl, optionally substituted phenyl or optionally substituted phenyl-$C_1$-$C_6$-alkyl, or is a radical of formula A.

R' in formula II is especially a radical of formula (A), $C_1$-$C_6$-alkyl or $C_3$-$C_6$-cycloalkyl and specifically is a radical of formula (A) where m is especially from 2 to 9 and specifically is 3; or is $C_1$-$C_4$-alkyl.

Oligomers comprising at least one repeat unit of general formula II may have not only formula I but also one or more terminal groups of formula IIa and also repeat units of formula IIb and/or branching sites of formulae IIc or IId:

R' in formulae IIa and IIc has the meanings indicated for formula II and is in particular a radical of formula (A), $C_1$-$C_6$-alkyl or $C_3$-$C_6$-cycloalkyl and specifically a radical of formula (A) where m is especially from 2 to 9 and specifically is 3; or is $C_1$-$C_4$-alkyl.

R'' in formula IIb is optionally substituted $C_1$-$C_6$-alkyl, optionally substituted $C_2$-$C_6$-alkenyl, optionally substituted $C_1$-$C_6$-alkoxy, optionally substituted $C_3$-$C_6$-cycloalkyl, optionally substituted phenyl or optionally substituted phenyl-$C_1$-$C_6$-alkyl, especially $C_1$-$C_6$-alkyl or $C_3$-$C_6$-cycloalkyl and specifically $C_1$-$C_4$-alkyl.

Typical oligomers comprising at least one repeat unit of the general formula II generally include on (number) average from 2 to 100 and especially from 2 to 50 silicon atoms subject to the proviso that on average it has at least one silicon atom present in the form of a repeat unit of formula II. An oligomer of this type preferably includes on average at least 2 and especially from 2 to 50 repeat units of formula II.

Silicon compound SV used in the process of the present invention may also comprise mixtures of various compounds of formula I or mixtures of one or more compounds of formula I with one or more oligomers comprising repeat units of formula II.

Silicon compound SV used in the process of the present invention preferably comprises compounds of formula I or mixtures of various compounds of formula I, especially those compounds of formula I or mixtures thereof where x is 3 or specifically 4.

Compounds of formula I and oligomers comprising repeat units of formula II and also their methods of making are known, or are obtainable for example similarly to the methods described in DE1247646, U.S. Pat. No. 3,364,160, U.S. Pat. No. 3,417,047, U.S. Pat. No. 4,071,498, DE2643467A1, DE3207336A1 and U.S. Pat. No. 4,603,177 or papers by S. Andrianov et al., Russ. Chem. Bull. 1972, 21, 1100-1102 (1977).

They are typically prepared by reacting at least one compound of formula VIII $$R_{4-x}SiCl_x \qquad (VIII)$$

where R and x are each as defined above, with a lactam of general formula (III)

(III)

where m is as defined above, especially 2, 3 or 9 and specifically 3, in the presence of at least one base. The base is preferably used into the base in an amount of 0.9 to 2 mol per mol of chlorine atom in the compound of formula VIII. Examples of suitable bases are particularly tertiary amines, especially tri-$C_1$-$C_4$-alkylamines and di-$C_1$-$C_4$-alkyl-$C_3$-$C_6$-cycloalkylamines such as triethylamine, tripropylamine, dimethylisopropyl-amine, methyldiisopropylamine, tributylamine and dimethylcyclohexylamine, and also $C_1$-$C_4$-alkylimidazoles such as N-methylimidazole.

The reaction of the compound of the formula VIII with the lactam of formula III typically takes place in a temperature range of −20 to 110° C. and preferably at from 20 to 30° C.

According to the present invention, the silicon compound SV is copolymerized with at least one comonomer selected from ammonium salts of dicarboxylic acids, aminocarboxylic acids and lactams.

According to the present invention, water is present during the copolymerization for at least some of the time. The water serves to hydrolyze the Si—N bond in the SV compound. This water may be formed in the copolymerization itself, namely when the CM comonomers comprise at least one compound that has a carboxyl group. In this case, the comonomers comprise at least one compound selected from ammonium salts of dicarboxylic acids, aminocarboxylic acids and aminocarboxamides and mixtures thereof. This water may also be added, in particular when the monomers comprise lactams only.

The CM comonomers preferably comprise at least one monomer selected from ammonium salts of dicarboxylic acids, aminocarboxylic acids and aminocarboxamides and mixtures thereof. In this way, the copolymerization leads to the formation of water which is then available to hydrolyze the Si—N bond in the SV compound.

In one preferred embodiment, the CM comonomers are exclusively one or more compounds selected from ammonium salts of dicarboxylic acids, aminocarboxylic acids and aminocarboxamides and mixtures thereof. In a likewise preferred embodiment, the comonomers comprise at least one monomer selected from ammonium salts of dicarboxylic acids, aminocarboxylic acids and aminocarboxamides and mixtures thereof, and at least one lactam.

The overall amount of water formed and/or added during the copolymerization is preferably at least 0.5 mol, especially at least 0.7 mol and specifically at least 0.9 mol per mole of lactam radicals of formula A which are attached to silicon atoms in the silicon compound SV. The overall amount of water formed and/or added during the copolymerization will preferably not exceed 2 mol, especially 1.5 mol and specifically 1.1 mol per mole of lactam radicals of formula A which are attached to silicon atoms in the silicon compound SV. This ensures complete conversion of the lactamyl-Si bond.

Suitable lactams are especially those of general formula III as defined above, especially those where m in formula III is from 2 to 9, for example 2, 3 or 9 and specifically 3. Examples of lactams of formula III are ε-caprolactam, 2-piperidone (δ-valerolactam), 2-pyrrolidone (γ-butyrolactam), capryllactam, enantholactam and lauryllactam.

Suitable aminocarboxylic acids are especially those of the general formulae IV and V:

$$H_2N\text{—}(CH_2)_y\text{—}COOH \qquad (IV)$$

$$H_2N\text{—}CHR^x\text{—}COOH \qquad (V)$$

y in formula (IV) is an integer from 1 to 20, especially from 2 to 12, for example 1, 2, 4, 5, 7, 9 or 11, and $R^x$ in formula (V) is optionally substituted $C_1$-$C_6$-alkyl, optionally substituted $C_2$-$C_6$-alkenyl, optionally substituted $C_1$-$C_6$-alkoxy, optionally substituted $C_3$-$C_6$-cycloalkyl, optionally substituted phenyl or optionally substituted phenyl-$C_1$-$C_6$-alkyl, and especially $C_1$-$C_4$-alkyl, phenyl or benzyl.

Examples of suitable aminocarboxylic acids of formula (IV) are glycine, 3-amino-propionic acid, 4-aminobutanoic acid, 5-aminovaleric acid, 6-aminocaproic acid, 8-aminocaprylic acid, 10-aminodecanoic acid, 12-aminododecanoic acid, 14-aminotetradecanoic acid, 16-aminohexadecanoic acid and 18-aminooctadecanoic acid.

Examples of suitable aminocarboxylic acids of formula V are alanine, phenylglycine, valine, leucine, isoleucine and phenylalanine.

Suitable aminocarboxamides are particularly ω-aminocarboxamides, especially the amides of the aforementioned aminocarboxylic acids of formula IV.

Suitable ammonium salts of dicarboxylic acids are particularly salts of dicarboxylic acids with diamines, especially of aliphatic or cycloaliphatic dicarboxylic acids with aliphatic, cycloaliphatic, araliphatic or aromatic diamines. Typical dicarboxylic acids generally have 3 to 20, especially from 3 to 14 and specifically from 3 to 8 carbon atoms. Aliphatic dicarboxylic acids are preferred dicarboxylic acids. Typical diamines generally have from 2 to 12, especially from 3 to 14 and specifically from 3 to 8 carbon atoms. The salts of aliphatic diamines are preferred.

Particularly preferred ammonium salts of dicarboxylic acids are salts of dicarboxylic acids of formula (IV) with diamines of formula (VII):

$$HOOC\text{—}(CH_2)_z\text{—}COOH \qquad (VI)$$

$$H_2N\text{—}(CH_2)_v\text{—}NH_2 \qquad (VII)$$

where z in formula (VI) is an integer from 1 to 12, especially from 1 to 4, and v in formula (VII) is an integer from 2 to 12, especially from 2 to 6.

Examples of dicarboxylic acids of formula (VI) are malonic acid, succinic acid, glutaric acid, adipic acid, pimelic acid, suberic acid, azelaic acid, sebacic acid and dodecanedioic acid. Aromatic $C_{8-20}$-dicarboxylic acids such as terephthalic acid and isophthalic acid can also be used.

Suitable diamines of formula VII include, for example, tetramethylenediamine, pentamethylenediamine, hexamethylenediamine, heptamethylenediamine, octamethylenediamine, nonamethylenediamine and decamethylenediamine. Hexamethylenediamine is particularly preferred.

The comonomers CM are preferably selected from:
b1) aminocarboxylic acids, especially those of formulae IV or V and specifically those of formula IV;
b2) ammonium salts of dicarboxylic acids, especially salts of dicarboxylic acids with diamines and specifically salts of dicarboxylic acids of formula VI with diamines of formula VII;
b3) mixtures of at least one lactam, especially at least one lactam of formula III, specifically caprolactam, with at least one ammonium salt of a dicarboxylic acid especially selected from salts of dicarboxylic acids with diamines and specifically from salts of dicarboxylic acids of formula VI with diamines of formula VII; and
b4) mixtures of at least one lactam, especially of at least one lactam of formula III, specifically caprolactam, with at least one aminocarboxylic acid, especially at least one aminocarboxylic acid of formulae IV or V and specifically at least one aminocarboxylic acid of formula IV.

The comonomers CM are particularly selected from the comonomers of the aforementioned groups b3) and b4), i.e., from mixtures of at least one lactam and at least one aminocarboxylic acid and also mixtures of at least one lactam and of at least one ammonium salt of a dicarboxylic acid. In the aforementioned groups b3) and b4), the molar ratio of lactam to aminocarboxylic acid or to the ammonium salt of the dicarboxylic acid is preferably at least 1.1:1 and especially at least 2:1 and lies in particular in the range from 1.1:1 to 500:1 and specifically in the range from 2:1 to 100:1.

The copolymerization of the at least one silicon compound SV with the at least one comonomer CM can be carried out similarly to conventional processes of polyamide production. A process of this type is described, for example, in Kunststoff Handbuch, ¾ Technische Thermoplaste: Polyamide, Carl Hanser Verlag, 1998, Munich, pages 42-47 and 65-70.

The type and amount of silicon compound SV provides specific control over the silicon content of the composite material obtained.

Preferably, silicon compound SV is used in an amount from 0.1% to 70% by weight, especially in an amount of 0.5% to 50% by weight and specifically in an amount of 1% to 25% by weight, based on the total amount of silicon compound SV plus comonomer.

In an advantageous embodiment of the process according to the present invention, said silicon compound SV and said comonomer CM are used in such an amount of substance ratio that during the reaction at least 0.7 mol of water is formed per mole of lactam radicals of formula A attached to silicon atoms in said silicon compound SV, or a corresponding amount of water is added, wherein the amount of substance ratios are particularly chosen such that the amount of water formed/added preferably does not exceed 2 mol, especially 1.5 mol and specifically 1.1 mol per mole of lactam radicals of formula A attached to silicon atoms in silicon compound SV. This ensures complete conversion of the lactamyl-silicon bond. More particularly, silicon compound SV and comonomer CM are used in such an amount of substance ratio that during the reaction from 0.7 to 2 mol of water, especially 0.9 to 1.2 mol of water and specifically from 0.9 to 1.1 mol of water per mole of lactam radicals of formula A attached to the silicon atoms in silicone compound SV are formed.

When the copolymerization is carried out using comonomers comprising carboxyl groups, for example aminocarboxylic acids or ammonium salts of a dicarboxylic acid, especially comonomers from the groups b1) or b2) or mixtures of monomers as per the aforementioned groups b3) and b4), these comonomers and silicon compound SV are preferably used in such an amount of substance ratio that the molar ratio of carboxyl groups in the comonomers to the lactam radicals of formula (A) attached to silicon atoms in said silicon compound SV is at least 0.7:1, especially at least 0.9:1 and especially in the range from 0.7:1 to 1.2:1 and specifically in the range from 0.9:1 to 1.1:1.

The copolymerization of the at least one silicon compound SV with the at least one comonomer CM can be carried out without the addition of a polymerization catalyst. The copolymerization can also be carried out in the presence of a polymerization catalyst. Typical polymerization catalysts include the amidation catalysts variously used in the production of polyamides, examples being Brönstedt acids such as hydrochloric acid, phosphoric acid, phosphorous acid, hypophosphorous acid or sulfuric acid.

The general procedure would be to heat a mixture of the at least one silicon compound SV with the at least one comonomer CM to the temperature required for polymerization. The temperatures required for copolymerization are naturally dependent on the type of the at least one silicon compound SV and on the type of the at least one comonomer CM, and can be determined by routine methods. The temperatures required for copolymerization are typically above 100° C. and are frequently at least 120° C. or at least 150° C. and will generally not exceed 320° C., frequently 300° C. and especially 280° C. More particularly, the copolymerization is carried out at temperatures in the range from 150 to 280° C. and specifically at temperatures in the range from 180° C. to 260° C.

The process of the present invention can be carried out under atmospheric pressure, under superatmospheric pressure or under the autogenous pressure of the system. In general, the absolute pressure in the polymerization reactor is preferably in a range of about 1 to 70 bar and more preferably in the range from 1.0 bar to 20 bar.

At the start of the polymerization, the mixture may comprise the total amount of comonomer CM and the total amount of silicon compound SV. But it is also possible for one or more constituents of the mixture, preferably the comonomers CM, to be partly added to the mixture during the polymerization.

The copolymerization of the at least one silicon compound SV with the at least one comonomer is generally carried out in bulk, i.e., in the substantial absence of inert diluents. The at least one silicon compound SV and the at least one comonomer CM comprise at least 90% by weight and especially at least 99% by weight of the mixture used for polymerization. However, the polymerization can also be practiced in the presence of inert diluents.

The copolymerization of the at least one silicon compound SV with the at least one comonomer can be practiced as a batch operation or as a continuous operation. Suitable reactors for batch or continuous copolymerization include the reactors customary for production of polyamides, which are known to a person skilled in the art. Continuous copolymerization is preferably carried out in a polymerization tube or a bundle of polymerization tubes. Specifically, a so-called VK tube is used for continuous copolymerization, where "VK" is German for "simplified continuous".

The copolymerization can be designed as a single-step process or as a multi-step process. In the case of a multi-step copolymerization, the first step comprises the formation of oligomers which then polymerize in the other steps to form the actual composite material. In the case of multi-step embodiment of a continuous copolymerization, it is preferable for one or more of the steps to be carried out in a VK tube. In the case of a multi-step embodiment of continuous copolymerization, the first step can take place in a pressurized pre-reactor.

The composite material generated in the copolymerization can be subjected to one or more aftertreatment steps, for example an extraction to remove unconverted monomers or oligomers, a drying step, a compounding step, shaping or pelletization or combinations thereof.

The composite material generated in the copolymerization can be shaped into one or more strands for example. Devices known to a person skilled in the art can be used for this. Perforate plates, dies or die plates are examples of suitable devices. Preferably, the composite material generated in the copolymerization is shaped in a flowable state into strands and is subjected in the form of a flowable strand-shaped reaction product to comminution into composite particles. The hole diameter is preferably in a range from 0.5 mm to 20 mm, more preferably from 1 mm to 5 mm and most preferably from 1.5 to 3 mm.

For pelletization, the composite material obtained by copolymerization and shaped into one or more strands can be solidified and subsequently pelletized. Suitable measures are described in, for example, Kunststoffhandbuch, ¾ Technische Thermoplaste: Polyamide, Carl Hanser Verlag, 1998, Munich, pages 68-69. Underwater pelletization, which a person skilled in the art likewise knows about in principle, is one specific method of shaping.

Extracting the composite material can be carried out similarly to the extraction of polyamides. Suitable processes and devices for the extraction of polyamides are known in principle to a person skilled in the art. In extraction, the level of monomers and any dimers and further oligomers in the composite material is reduced by treatment with an extractant. Industrially, this can be accomplished for example by continuous or batch extraction with hot water (DE 2501348 A, DE 2732328 A) or in superheated steam (EP 0284968 W1). The extractant used preferably comprises water or consists of water. Suitable extractants also include mixtures of water with $C_1$-$C_4$-alkanols such as water-ethanol mixtures. Extractant temperature is preferably in a range from 75 to 130° C., more preferably from 85 to 120° C. Extraction can be practiced as a continuous operation or as a batch operation.

The as-extracted monomers or oligomers can be recovered from the extractant and used correspondingly in polyamide production or in composite production according to the present invention.

Preferably, the extracted composite material is subjected to a conventional drying operation. For example, the extracted composite material can be dried by contacting with dry air or a dry inert gas or a mixture thereof. An inert gas, for example nitrogen, is preferably used for drying. The extracted composite material can also be dried by contacting with superheated steam or a mixture thereof with a gas other than superheated steam, preferably an inert gas. Customary dryers can be used, for example countercurrent, cross-flow, pan, tumble, paddle, trickle, cone or shaft dryers, fluidized beds, etc. Batch drying in a tumble or cone dryer under reduced pressure is a suitable option. Continuous drying in drying tubes, through which a gas which is inert under the drying condition flows, is another suitable option. In one specific embodiment, at least one shaft dryer is used for drying. Preferably there is a flow through the shaft dryer of a hot gas which is inert under postpolymerization conditions. Nitrogen is a preferred inert gas.

The composite materials obtainable by the process of the present invention comprise not only a polyamide, resulting from the copolymerization of comonomers CM with the lactam radicals of formula (A) present in silicon compound SV, but also one or more silicon-containing phases, which form a fine dispersion in the polyamide matrix. Depending on the type of silicon compound SV, the silicon-containing phase concerns silicon dioxide or a polysiloxane phase or a mixture of silicon dioxide and polysiloxane phases. Silicon dioxide phases are formed particularly when the silicon atoms in silicon compound SV bear exclusively lactam radicals of formula A or exclusively lactam radicals of formula A and alkoxy radicals, while polysiloxane phases are notably formed when the silicon atoms in silicon compound SV have radicals attached via carbon atoms as well as lactam radicals of formula A.

As mentioned, the silicon content of polyamide composite materials according to the present invention can be varied. The silicon content is typically in the range from 0.1% to 10.0% by weight of Si and especially in the range from 0.8% to 5.0% by weight of Si, based on the total weight of the composite material, reckoned as silicon.

In the silicon-containing polyamide composite materials of the present invention, the silicon-containing phases are finely dispersed in the polyamide matrix in that generally not less than 90% of the $SiO_2$ phases and/or polysiloxane phases have maximum domain sizes of 40 μm, especially of 1 μm, and frequently have domain sizes in the range from 5 nm to 40 μm, preferably in the range from 10 to 1000 nm and especially in the range from 20 to 500 nm, determined using SEM/EDX images or HAADF-STEM measurements.

The polyamides in the silicon-containing polyamide composite materials of the present invention generally have a number-average molecular weight $M_n$ in the range from 15 000 to 50 000 and especially in the range from 18 000 to 35 000. The weight-average molecular weight $M_w$ of these polyamides lies generally in the range from 40 000 to 225 000 and especially in the range from 45 000 to 140 000. The molecular weight distribution of the polyamides is typically characterized by a polydispersity ($=M_w/M_n$) in the range from 2.5 to 4.5 especially in the range from 3 to 4.

The polyamide composite materials of the present invention are typically obtained in powder or pellet form owing to their method of making.

The silicon-containing polyamide composites of the present invention have in-principle suitability for all applications where polyamides are typically used. These are notably the production of films, fibers, monofilaments, pipes, corrugated pipes, profiles and also any form of semi-fabricated products or plastic articles obtained through known and customary shaping/spinning processes.

The polyamide-silicon composites of the present invention and their production will now be more particularly elucidated by Examples 1 to 4, table 1 and FIGS. 1 to 7. These illustrate some aspects of the present invention and must in no way be construed as limiting the scope of protection.

ABBREVIATIONS

Smp.: melting point
PMMA: methyl methacrylate
HFIP: hexafluoroisopropanol
DSC: differential scanning calorimetry
GPC: gel permeation chromatography
SEM: scanning electron microscopy
EDX: energy-dispersive x-ray spectroscopy
ATR-FTIR: attenuated total reflection Fourier transform infrared spectroscopy.

Analysis

SEM/EDX images were recorded with a Nova NanoSEM 200 from FEI Company. The samples were coated with platinum before examination. The scale/magnification is indicated on the pictures.

Solid state NMR investigations of pulverulent samples were carried out on a Bruker Avance 400 spectrometer (frequency of $^1H$ spectra: 400.13 MHz, $^{13}C$ spectra: 100.622 MHz) with a wide bore magnet and double resonance probe heads. $^{13}C\{^1H\}$-CP-MAS spectra were recorded with the aid of 4 mm rotor vessels. Referencing was against adamantane as external standard ($\delta=38.5$ ppm). $^{29}Si\{^1H\}$-CP-MAS spectra were recorded with the aid of 7 mm rotor vessels. Referencing was against tetrakistrimethylsilylsilane as external standard ($\delta=-9.5$ ppm).

DSC measurements were carried out with a DSC1 instrument from Mettler Toledo. Aluminum crucibles were used, crucible size 40 µl. The measurement was made with a perforate lid under an applied nitrogen stream of 50 ml/min. Heating rate was 10 K/min Molecular weights were determined using gel permeation chromatography (GPC). The GPC measurements were carried out using an Agilent 1100 Series instrument from Agilent Technologies, USA, which had three columns (HFIP-LG Guard, and PL HFIPGel). The eluent used was hexafluoroisopropanol (HFIP)+0.05% $CF_3COOK$. Polymethyl methacrylate (PMMA) was used as standard. The measurements were carried out under application of the following parameters: column temperature 40° C., flow rate 1 ml/min, concentration 1.5 mg/ml, filtered through Millipore Millex FG (0.2 µm)

The ATR-FTIR spectra were recorded using an FTIR spectrometer from BIO-RAD, FTS 165, with a Golden Gate accessory. The samples were applied directly to the measuring head and were held pressed in place by a sapphire anvil under a defined pressure of 5 bar. The measured data were captured by the Win-IR program 1M and depicted and evaluated using Origin.

Quantitative analysis of the elements C, H and N in the pulverulent samples was formed using a varioMICRO CHNS instrument from Elementar Analysensysteme GmbH. Reported values are the means of duplicate determinations.

PREPARATION EXAMPLES

Example 1

Composite Material with 1.8% by Weight of $SiO_2$

A tank was initially charged with 15 g of ε-caprolactam, 3.3 g of ω-aminocaproic acid and 3.0 g of 1,1',1",1"'-silanetetrayltetrakis(azepan-2-one). The tank was subsequently purged with argon three times. The tank was pressurized to about 10 bar (argon) for the polymerization. The tank was heated to 230° C. in the course of about an hour, the stirrer being switched on at about 100° C. The temperature of 230° C. was maintained for 2.5 h. The pressure rose to about 15 bar in the course of the reaction. In the last 15 min, the pressure was gradually reduced to atmospheric.

After cooling, the composite material was extracted with methanol for 16 hours.

Smp. (DSC) 221° C.; elemental analysis mass % (by theory): C %: 61.0 (61.9), H %: 9.61 (9.64), N %: 11.8 (12.0), rest %: 17.6 (16.5)

Example 2

Composite Material with 5.0% by Weight of $SiO_2$

A tank was initially charged with 2.0 g of ε-caprolactam, 8.7 g of ω-aminocaproic acid and 9.3 g of 1,1',1",1"'-silanetetrayltetrakis(azepan-2-one). The tank was subsequently purged with argon three times. The tank was pressurized to about 10 bar (argon) for the polymerization. The tank was heated to 230° C. in the course of about an hour, the stirrer being switched on at about 100° C. The temperature of 230° C. was maintained for 2.5 h. The pressure rose to about 15 bar in the course of the reaction. In the last 15 min, the pressure was gradually reduced to atmospheric.

After cooling, the composite material was extracted with methanol for 16 hours. Extractables amounted to 12%.

Smp. (DSC) 220° C.; elemental analysis mass % (by theory): C %: 58.4 (58.3), H %: 9.24 (9.32), N %: 11.3 (11.3), rest %: 21.2 (21.1)

Example 3

Composite Material with 1.7% by Weight of $SiO_2$/0.5% by Weight of Polysiloxane A tank was initially charged with 15.0 g of ε-caprolactam, 3.9 g of ω-aminocaproic acid, 0.6 g of 1,1',1"-(methylsilanetriyl)tri(azepan-2-one) and 3.3 g of 1,1',1",1"'-silanetetrayltetrakis(azepan-2-one). The tank was subsequently purged with argon three times. The tank was pressurized to about 10 bar (argon) for the polymerization. The tank was heated to 230° C. in the course of about an hour, the stirrer being switched on at about 100° C. The temperature of 230° C. was maintained for 2.5 h. The pressure rose to about 15 bar in the course of the reaction. In the last 15 min, the pressure was gradually reduced to atmospheric.

After cooling, the composite material was extracted with methanol for 16 hours. A composite material with 1.7% by weight of $SiO_2$/0.5% by weight of polysiloxane was obtained.

Smp. (DSC) 221° C.; elemental analysis mass % (by theory): C %: 62.1 (61.3), H %: 9.79 (9.29), N %: 12.0 (11.9), rest %: 16.2 (17.5)

The GPC results are summarized in table 1.

Example 4

Composite Material with 4.0% by Weight of $SiO_2$/1.1% by Weight of Polysiloxane A tank was initially charged with 6.0 g of ε-caprolactam, 11.9 g of ω-aminocaproic acid, 1.8 g of 1,1',1''-(methylsilanetriyl)tri(azepan-2-one) and 9.0 g of 1,1',1'',1'''-silanetetrayltetrakis(azepan-2-one). The tank was subsequently purged with argon three times. The tank was pressured to about 10 bar (argon) for the polymerization. The tank was heated to 230° C. in the course of about an hour, the stirrer being switched on at about 100° C. The temperature of 230° C. was maintained for 2.5 h. The pressure rose to about 15 bar in the course of the reaction. In the last 15 min, the pressure was gradually reduced to atmospheric.

After cooling, the composite material was extracted with methanol for 16 hours.

Smp. (DSC) 221° C.; elemental analysis mass % (by theory): C %: 61.0 (58.7), H %: 9.62 (9.38), N %: 11.8 (11.5), rest %: 17.6 (20.3)

The GPC results are summarized in table 1.

TABLE 1

GPC results for Examples 3 and 4; eluent HFIP + 0.05% $CF_3COOK$, standard PMMA, column temperature 40° C.

| Sample | $M_n$ in g/mol | $M_w$ in g/mol | Dispersity $M_w/M_n$ |
|---|---|---|---|
| Example 3 | 17000 | 45700 | 2.7 |
| Example 4 | 15500 | 37500 | 2.4 |

Figure 1:
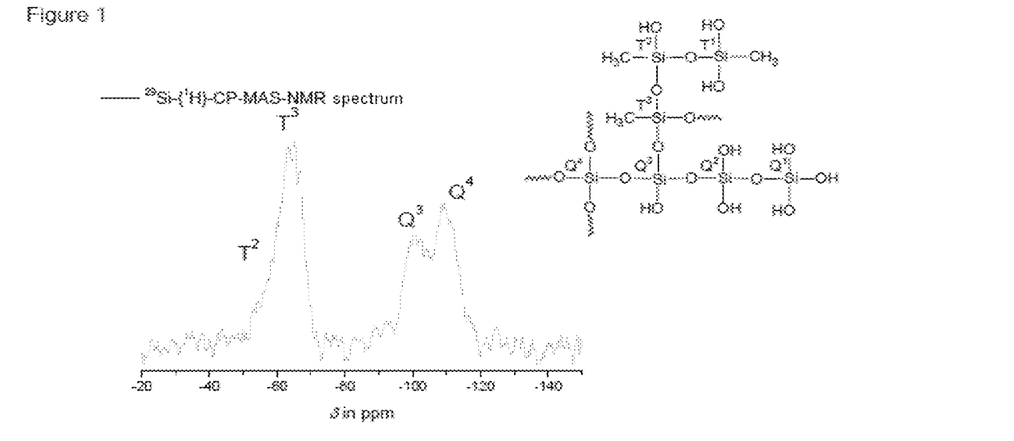
FIG. 1: $^{29}Si-\{^{1}H\}$-CP-MAS-NMR spectrum of composite material from Example 4

Figure Description:

FIG. 1 shows a $^{29}Si$-{$^1H$}-CP-MAS-NMR spectrum of the composite material from Example 4. It is apparent from FIG. 1 that a silicon dioxide network, evidenced by Q signals at about −100 ppm, with polysiloxane units, visible from T-signals at about −60 ppm, was formed.

Figure 2:
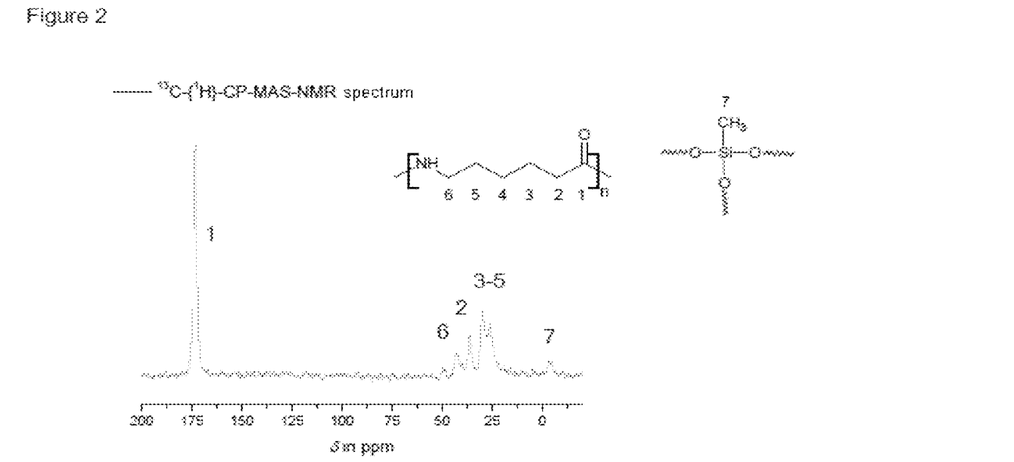
FIG. 2: $^{13}C-\{^{1}H\}$-CP-MAS-NMR spectrum of composite material from Example 4

FIG. 2 shows a $^{13}C$-{$^1H$}-CP-MAS-NMR spectrum of the composite material from Example 4. Visible therein are not only all structural units of the resulting nylon-6 (methylene carbon at 25-50 ppm and carbonyl carbon at about 174 ppm) but also methyl groups of the polysiloxane network at about −7 ppm.

Figure 3:
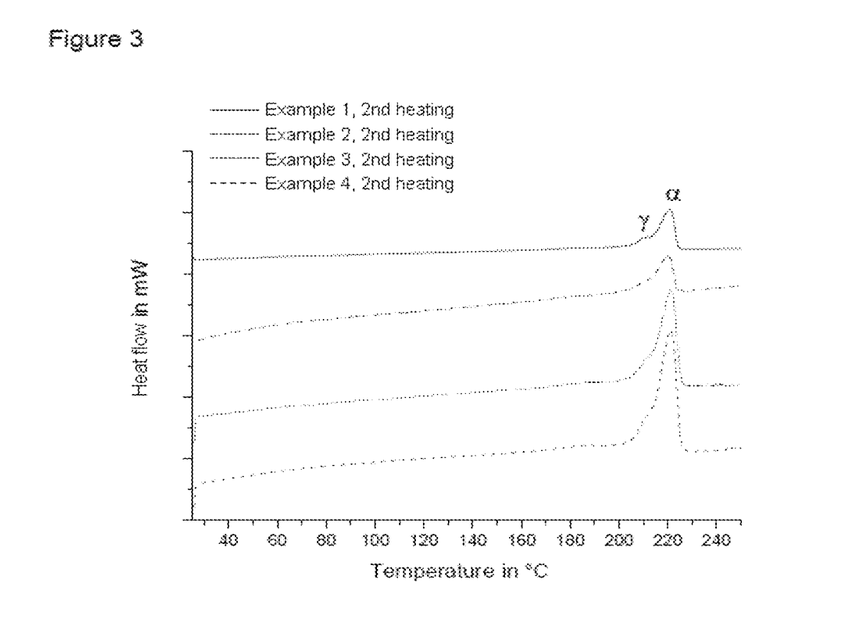
FIG. 3: DSC curves of composite materials from Examples 1-4, $2^{nd}$ heating curve of cyclic measurements, heating rate 10 K/min, 50 ml/min $N_2$

FIG. 3 shows the 2$^{nd}$ heating curve of cyclic DSC measurements of the materials after extraction. The nylon-6 formed melts at about 220° C. Not only the α-form but also the γ-form is apparent.

Figure 4:
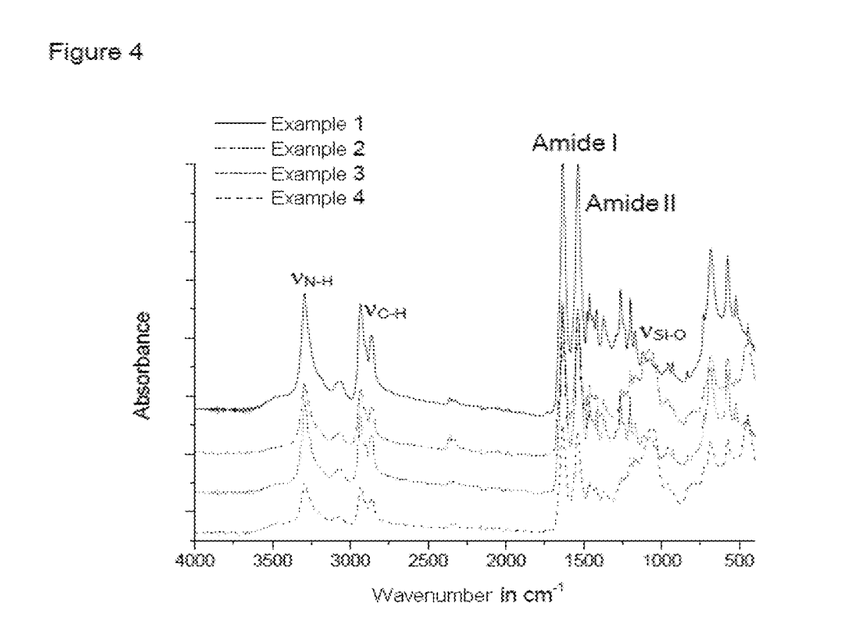
FIG. 4: ATR-FTIR spectra of composite materials from Examples 1-4

The FTIR spectra in FIG. 4 show characteristic bands for the composite material formed. Apparent are not only typical bands for nylon-6 such as the N—H stretching vibration at about 3300 cm$^{-1}$ or the amide I and II band, but also the Si—O stretching vibration at about 1070 cm$^{-1}$, which is typical of the $SiO_2$/polysiloxane network.

Figure 5:
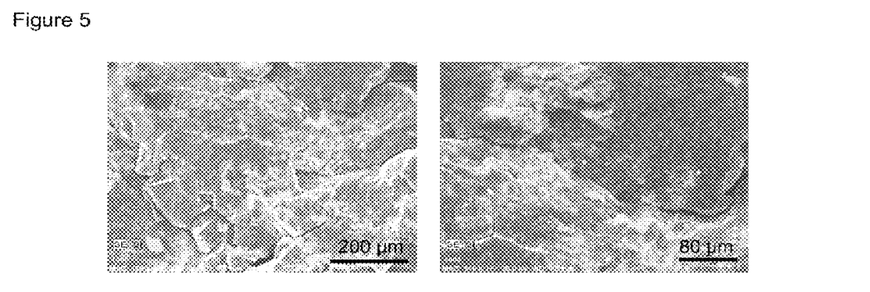
FIG. 5: SEM/EDX images of platinum-coated composite material from Example 3

FIG. 5 shows electron micrographs of the composite material from Example 3. In the chosen imaging variation, silicon looks light and all the other elements look darker. The micrographs show a relatively homogeneous distribution for the silicon across the sample cross section considered.

Figure 6:
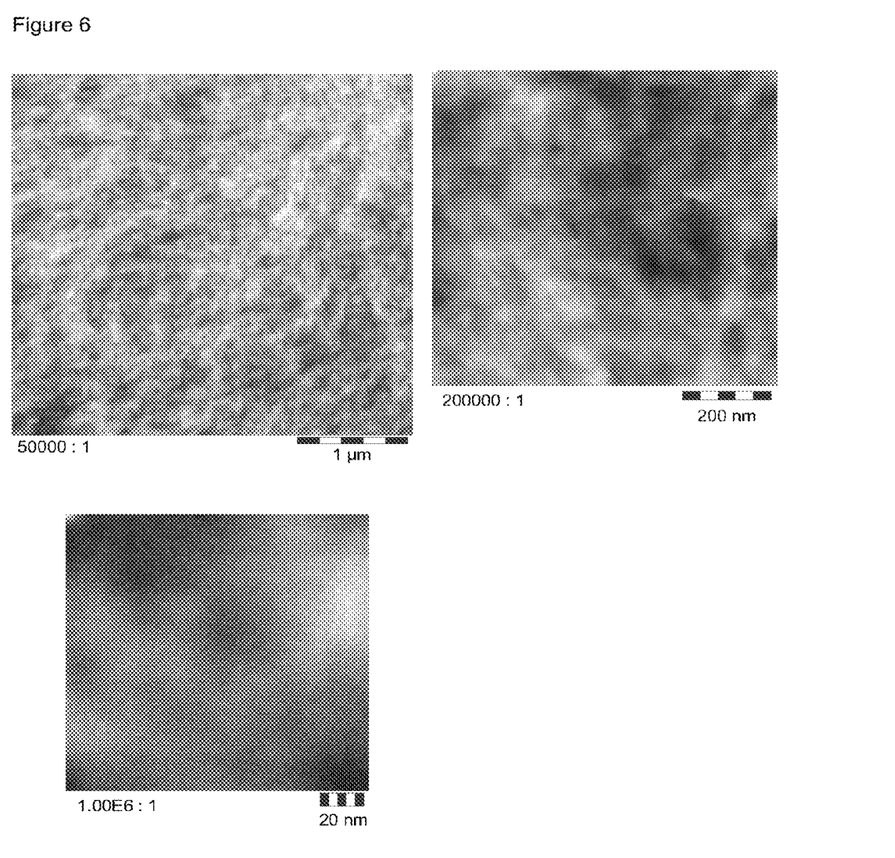
FIG. 6: HAADF-STEM images of composite material from Example 3 at various resolutions
Figure 7:
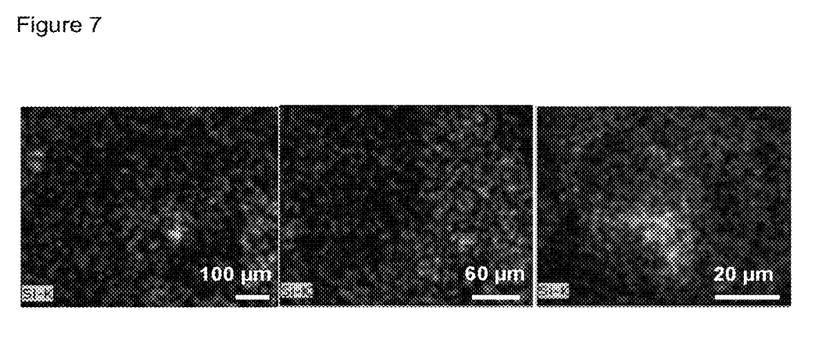
FIG. 7: EDX images of platinum-coated composite material from Example 1

FIG. 6 shows HAADF-STEM images of the composite material from Example 3. In this method of measurement, silicon-rich regions appear lighter than low-silicon regions. The images show the relatively homogeneous distribution for the silicon content. Primary particles about 5 nm in size are present in larger agglomerates.

EDX images of the platinum-coated composite material from Example 1. The elemental distribution of silicon in the composite material from Example 1 is visible in FIG. 7. The silicon dioxide formed is present across the sample cross section in a relatively homogeneous distribution. The primary particles are partly agglomerated.

We claim:

1. A process for producing a silicon-containing polyamide composite material, comprising copolymerizing:

a. at least one silicon compound SV comprising a silicon atom comprising a lactamoyl radical attached via its nitrogen atom and having a formula (A), (A)

where m is an integer from 1 to 11 and # is the point of attachment to the silicon atom; with b. at least one comonomer CM selected from the group consisting of an ammonium salt of a dicarboxylic acid, an aminocarboxylic acid, an aminocarboxamide, and a lactam, wherein the at least one comonomer CM is such that water is formed during the copolymerizing, or water is added to the copolymerization reaction, wherein the silicon compound SV and the comonomer CM are present in such an amount of substance ratio that during the reaction at least 0.7 mol of water is formed per mole of lactam radicals of formula A attached to silicon atoms in the silicon compound SV, or a corresponding amount of water is added.

2. The process according to claim 1 wherein the silicon compound SV is selected from the group consisting of i), ii) and iii):

i) a compound of formula (I)

(I)

where m is an integer from 1 to 11, x is 1, 2, 3 or 4, and

R is optionally substituted $C_1$-$C_6$-alkyl, optionally substituted $C_2$-$C_6$-alkenyl, optionally substituted $C_1$-$C_6$-alkoxy, optionally substituted $C_3$-$C_6$-cycloalkyl, optionally substituted phenyl or optionally substituted phenyl-$C_1$-$C_6$-alkyl;

ii) an oligomer comprising a repeat unit of formula (II);

(II)

where in is an integer from 1 to 11 and R' is a lactamyl radical of formula (A) or has one of the meanings indicated for R in formula (I); and iii) a mixture of compounds of formula (I) and the oligomers comprising repeat units of formula (II).

3. The process according to claim 2, wherein the silicon compound SV is a compound of formula (I) where x is 3 or 4.

4. The process according to claim 1, wherein the copolymerizing is conducted at a temperature in a range from 150 to 280° C.

5. The process according to claim 1, wherein the comonomer is selected from the group consisting of:
b1) an aminocarboxylic acid;
b2) an ammonium salt of a dicarboxylic acid;
b3) a mixture of at least one lactam with at least one ammonium salt of a dicarboxylic acid; and
b4) a mixture of at least one lactam with at least one aminocarboxylic acid.

6. The process according to claim 1, wherein the comonomer is
a mixture of at least one lactam and at least one aminocarboxylic acid or
a mixture of at least one lactam and at least one ammonium salt of a dicarboxylic acid.

7. The process according to claim 6 wherein a molar ratio of the lactam to the aminocarboxylic acid or to the ammonium salt of a dicarboxylic acid is at least 1.1:1.

8. The process according to claim 5, wherein the aminocarboxylic acid or the ammonium salt of the dicarboxylic acid and the silicon compound SV are present in such an amount of substance ratio that a molar ratio of carboxyl groups in the comonomer to the lactam radicals of formula (A) attached to silicon atoms in the silicon compound SV is at least 0.9:1.

9. The process according to claim 1, wherein the comonomer comprises a lactam having a formula (III)

(III)

where in is an integer from 1 to 11.

10. The process according to claim 1, wherein the comonomer comprises an aminocarboxylic acid selected from the group consisting of compounds of formulae (IV) and (V)

$H_2N-(CH_2)_y-COOH$ (IV)

$H_2N-CHR^x-COOH$ (V)

wherein:
y in formula (IV) is from 1 to 20 and
$R^x$ in formula (V) is optionally substituted $C_1$-$C_6$-alkyl, optionally substituted $C_2$-$C_6$-alkenyl, optionally substituted $C_1$-$C_6$-alkoxy, optionally substituted $C_3$-$C_6$-cycloalkyl, optionally substituted phenyl or optionally substituted phenyl-$C_1$-$C_6$-alkyl.

11. The process according to claim 1, wherein the comonomer comprises an ammonium salt of a dicarboxylic acid that is a salt of dicarboxylic of formula (IV) with a diamine of formula (VII)

$HOOC-(CH_2)_z-COOH$ (VI)

$H_2N-(CH_2)_v-NH_2$ (VII)

where z in formula (VI) is an integer from 1 to 12 and v in formula (VII) is an integer from 2 to 12.

12. A silicon-containing polyamide composite material obtained by the process according to claim 1.

13. The polyamide composite material according to claim 12 comprising from 0.1% to 10.0% by weight of silicon, based on a total weight of the composite material.

14. A film, fiber, monofilament, pipe, profile, semi-fabricated product, or plastic article, comprising the polyamide composite material according to claim 12.

15. The process according to claim 1, wherein the comonomer comprises an ammonium salt of a dicarboxylic acid.

16. The process according to claim 1, wherein the comonomer comprises an aminocaboxylic acid.

17. The process according to claim 1, wherein the comonomer comprises an aminocarboxamide.

18. The process according to claim 1, wherein the comonomer comprises a lactam.

* * * * *